(12) United States Patent
Kennedy et al.

(10) Patent No.: US 9,659,214 B1
(45) Date of Patent: May 23, 2017

(54) LOCALLY OPTIMIZED FEATURE SPACE ENCODING OF DIGITAL DATA AND RETRIEVAL USING SUCH ENCODING

(71) Applicant: YAHOO! INC., Sunnyvale, CA (US)

(72) Inventors: Lyndon Kennedy, San Francisco, CA (US); Ioannis Kalantidis, San Francisco, CA (US); David Shamma, San Francisco, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/953,925

(22) Filed: Nov. 30, 2015

(51) Int. Cl.
| | | |
|---|---|---|
| *G06K 9/00* | (2006.01) | |
| *G06K 9/52* | (2006.01) | |
| *H04N 19/94* | (2014.01) | |
| *G06F 17/30* | (2006.01) | |
| *G06K 9/46* | (2006.01) | |

(52) U.S. Cl.
CPC ... *G06K 9/00483* (2013.01); *G06F 17/30321* (2013.01); *G06F 17/30324* (2013.01); *G06K 9/00409* (2013.01); *G06K 9/00463* (2013.01); *G06K 9/00469* (2013.01); *G06K 9/00536* (2013.01); *G06K 9/52* (2013.01); *H04N 19/94* (2014.11); *G06K 2009/4666* (2013.01)

(58) Field of Classification Search
CPC ......... G06K 9/00483; G06K 9/00463; G06K 9/00469; G06K 9/00409; G06K 9/00422; G06K 9/00442; G06K 9/00536; G06K 9/52; G06K 2009/4666; H04N 19/94; G06F 17/30321; G06F 17/30324
See application file for complete search history.

(56) References Cited

U.S. PATENT DOCUMENTS

| | | | | |
|---|---|---|---|---|
| 6,456,738 B1 * | 9/2002 | Tsukasa | ............ | G06K 9/00442 382/175 |
| 6,463,426 B1 * | 10/2002 | Lipson | ............. | G06F 17/30247 |
| 6,542,635 B1 * | 4/2003 | Hu | ..................... | G06K 9/00463 382/173 |
| 6,562,077 B2 * | 5/2003 | Bobrow | ............ | G06F 17/30011 382/306 |
| 6,826,724 B1 * | 11/2004 | Shimada | ............. | G06F 17/2229 707/999.004 |
| 7,363,311 B2 * | 4/2008 | Fujita | ................. | G06F 17/30601 |
| 7,788,292 B2 * | 8/2010 | Kolcz | .................... | G06Q 10/10 707/803 |
| 7,948,664 B2 * | 5/2011 | Morimoto | ......... | G06K 9/00442 345/173 |

(Continued)

*Primary Examiner* — Manav Seth
(74) *Attorney, Agent, or Firm* — James J. DeCarlo; Greenberg Traurig, LLP (57) ABSTRACT

A digital document is represented as a set of codes comprising indices into a feature space comprising a number of subspaces, each code corresponds to one subspace and identifying a cell within the subspace. Each digital document can be represented by a code set, and the code set can be used as selection criteria for identifying a number of digital documents using each digital document's corresponding code set. By way of some non-limiting examples, digital document code sets can be used to identify similar or different digital images, used to identify duplicate or nearly-duplicate digital images, used to identify similar and/or different digital images for inclusion in a recommendation, used to identify and rank digital images in a set of search results.

24 Claims, 8 Drawing Sheets

(56) References Cited

U.S. PATENT DOCUMENTS

| | | | |
|---|---|---|---|
| 8,086,048 B2* | 12/2011 | Naaman | G06F 17/30241 |
| | | | 382/155 |
| 8,160,365 B2* | 4/2012 | Campbell | G06K 9/3208 |
| | | | 382/190 |
| 8,538,896 B2* | 9/2013 | Mensink | G06F 17/30722 |
| | | | 706/12 |
| 9,483,794 B2* | 11/2016 | Amtrup | G06Q 20/3276 |
| 2010/0318477 A1* | 12/2010 | Perronnin | G06N 99/005 |
| | | | 706/12 |
| 2011/0106732 A1* | 5/2011 | Chidlovskii | G06F 17/30705 |
| | | | 706/12 |

* cited by examiner

LOCALLY OPTIMIZED FEATURE SPACE ENCODING OF DIGITAL DATA AND RETRIEVAL USING SUCH ENCODING

FIELD OF THE DISCLOSURE

The present disclosure generally relates to identification and retrieval of digital data, such as and without limitation digital images, using feature space encoding of the digital data.

BACKGROUND

The proliferation of digital images available on the Internet, as well as other sources, has made it difficult to locate particular images. The number of digital images on the internet, as well as other sources, is far too great for a computer user to be able to sift through the images to identify those images of interest to the user without assistance. The sheer volume of digital images, and other digital data, creates challenges for computing system resources.

SUMMARY

It would be beneficial to improve digital data processing technology, including digital data search and retrieval, since the need for such capability is widespread and of ever increasing importance as the magnitude of digital images is continually increasing. Embodiments of the present disclosure improve technology via, at least, by processing digital data for search, retrieval, recommendation, etc., by determining a feature space code vector for each digital data item and search criteria and using such code vectors for digital data item identification and retrieval among other features and functions disclosed herein, thus speeding the process and/or making it more efficient, thus improving processing and response times.

In accordance with one or more embodiments, a digital image is represented as a set of codes comprising indices into a feature space comprising a number of subspaces, each of which comprising a number of cells. In accordance with one or more such embodiments, a code set is identified for each of a number of digital images, each digital image's code set comprising a number of feature space indices, which can be compared to a number of other digital images' code sets. By way of some non-limiting examples, the digital image code sets determined in accordance with one or more embodiments can be used to identify similar or different digital images. By way of some further non-limiting examples, the determined digital image code sets may be used to identify duplicate or nearly-duplicate digital images in a de-duplication process, used to identify similar and/or different digital images for inclusion in a recommendation, used to identify and rank digital images in a set of search results. Embodiments of the present disclosure result in the ability for efficient processing, identification, selection and retrieval of digital images.

In accordance with one or more embodiments, a method is provided, the method comprising generating, by a computing device, a feature vector for a digital document, the generated feature vector comprising a plurality of features of the digital document; partitioning, by the computing device, the digital document's feature vector into a plurality of feature vector segments, each feature vector segment corresponding to a subspace of a plurality of subspaces of a feature space, each subspace comprising a plurality of cells; generating, by the computing device, a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and making a determination, by the computing device, whether to select the digital document, in response to a digital document request, the determination comprising determining a score for the digital document by comparing the digital document's code vector and a code vector associated with the digital document request to determine a number of matches and making the determination using the determined score.

In accordance with one or more embodiments a system comprising at least one computing device, each computing device comprising a processor and a storage medium for tangibly storing thereon program logic for execution by the processor, is provided, the stored program logic comprising generating logic executed by the processor for generating a feature vector for a digital document, the generated feature vector comprising a plurality of features of the digital document; partitioning logic executed by the processor for partitioning the digital document's feature vector into a plurality of feature vector segments, each feature vector segment corresponding to a subspace of a plurality of subspaces of a feature space, each subspace comprising a plurality of cells; generating logic executed by the processor for generating a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and making logic executed by the processor for making a determination whether to select the digital document, in response to a digital document request, making the determination comprising determining a score for the digital document by comparing the digital document's code vector and a code vector associated with the digital document request to determine a number of matches and making the determination using the determined score.

In accordance with yet another aspect of the disclosure, a computer readable non-transitory storage medium is provided, the medium for tangibly storing thereon computer readable instructions that when executed cause at least one processor to generate a feature vector for a digital document, the generated feature vector comprising a plurality of features of the digital document; partition the digital document's feature vector into a plurality of feature vector segments, each feature vector segment corresponding to a subspace of a plurality of subspaces of a feature space, each subspace comprising a plurality of cells; generate a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and make a determination whether to select the digital document, in response to a digital document request, making the determination comprising determining a score for the digital document by comparing the digital document's code vector and a code vector associated with the digital document request to determine a number of matches and making the determination using the determined score.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 5, which comprises FIGS. 5A and 5B, provides a process flow for use in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

In general, the present disclosure includes a system, method and architecture configured for locally-optimized feature space encoding of digital data and retrieval, selection, identification, etc. of digital data using such feature space encoding. Embodiments of the present disclosure provide an approach that is highly parallelizable and can handle a large number of query documents, e.g., a number of request code vectors, each of which can represent an input query or a partial input query, as well as a large set, or sets, of documents to be searched. Advantageously, embodiments of the present disclosure provide fast, scalable searching, which provides a ranking capability and can be run in parallel. Certain embodiments of the present disclosure will now be discussed with reference to the aforementioned figures, wherein like reference numerals refer to like components.

In accordance with one or more embodiments, a feature subspace is partitioned into a number of subspaces, each of which may be further partitioned into a number of regions, or cells. Subspace regions, or cells, may also be referred to herein as Voronoi regions, or cells. Each digital data item, or digital document, such as and without limitation a digital image, can be represented using a number of codes, each feature subspace having a corresponding code identifying a cell within the feature subspace to which the digital document is mapped using a feature vector. A digital data item, or digital document, can comprise content such as digital images, audio content, video content, multimedia content, streaming media, etc.

Embodiments of the present disclosure can be used to search a collection, set, library, etc. comprising a number of digital documents. The search can be a large scale search involving any number of query inputs, e.g., a number of search criterion, and any size digital document library, or collection. By way of a non-limiting example, each query input comprises a code vector, which may be generated using a digital data item. By way of a non-limiting example, a query input may identify a number of digital data items, each of which can be represented as a code vector.

Advantageously, a search can be parallelized and can provide a ranking of the digital documents in the search library based on a number of code collisions each digital document has with each query input. Parallelized searching provided in accordance with one or more embodiments of the present disclosure provides greater efficiencies than sequential searching in general, and sequential nearest-neighbor searching, for example. By way of a non-limiting example, searching can be performed for each of a number of query inputs and/or in each of a number of feature subspaces in parallel.

In accordance with one or more embodiments, a feature subspace can be partitioned into a number of subspaces, and a number of regions, or cells, can be identified in each feature subspace using feature representations of digital documents. Each digital document, and each search query, can be represented as a set of codes, which code set may also be referred to herein as a code vector. Each code set comprising a number of codes, each code in a set corresponding to a respective feature subspace and identifying a certain region, or cell, within the feature subspace. In accordance with one or more embodiments, each code in the code set can be used as a pointer into an index, e.g., an inverted index, identifying the digital documents mapped to the region identified by the code.

Embodiments of the present disclosure are described using digital images as an example of digital documents. It should be apparent however that a digital document can be any type of digital data item, and that such digital data item can be represented as a set of features determined for the digital data item.

In accordance with at least one embodiment of the present disclosure, a feature vector is generated for each digital document, and a digital document's feature vector comprises a number of features determined for the digital document. By way of a non-limiting example, a feature vector for a digital image can comprise a number of features of the digital image. By way of a further non-limiting example, a digital image's feature vector can comprise a number of visual features of the digital image. A digital image's feature vector is used to generate the digital image's code vector, which provides a mapping of the digital image into each feature subspace and a respective cell within each feature subspace.

Figure 1:
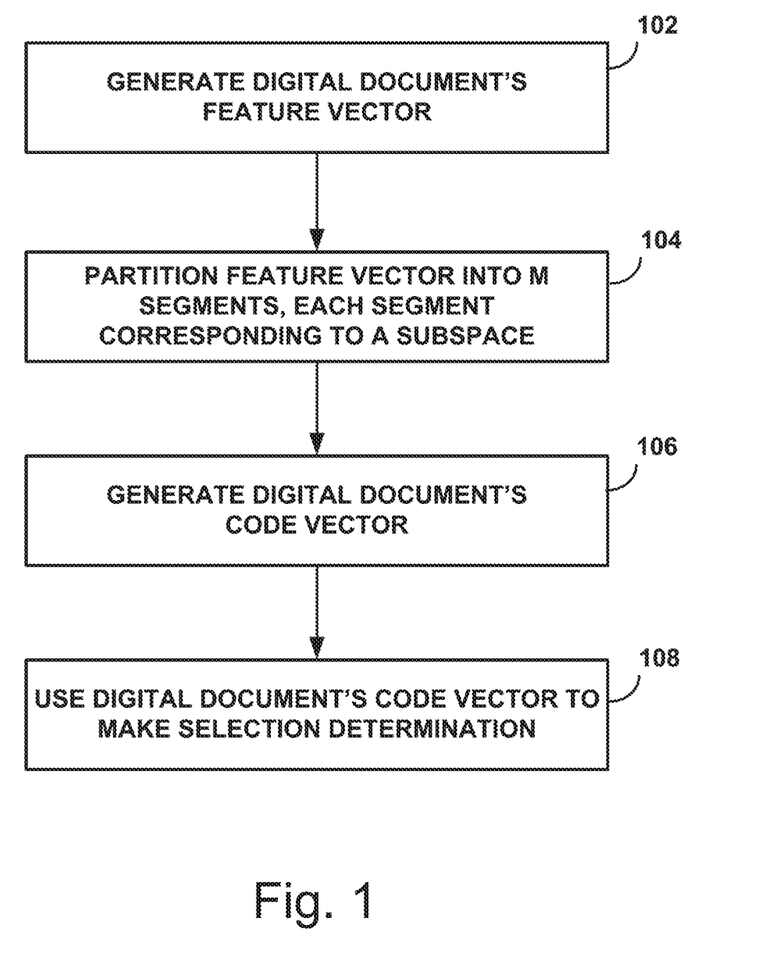
FIG. 1 provides an example of a process flow for use in accordance with one or more embodiments of the present disclosure.

FIG. 1 provides an example of a process flow for use in accordance with one or more embodiments of the present disclosure. At step 102, a feature vector is generated for a digital data item, or digital document, such as a digital image. A feature vector is a d-dimensional vector comprising a number of numerical features that represent the digital document. The dimension, d, may be any value, such as and without limitation 256. The features can be derived using the content of the digital data item, metadata associated with the data item, etc. By way of some non-limiting examples, features representing a digital image might include features generated using pixel intensity values, pixel colors, objects detected in the image, visual features of the image, etc. By way of a further non-limiting example, a text document might be represented using a Bag of Words approach, an n-gram approach, etc.

At step 104, the digital document's feature vector is partitioned into a number, m, which corresponds to the number of subspaces into which a feature subspace is partitioned. In accordance with one or more embodiments, the value of d, the dimension of the feature vector is a multiple of m, the number of feature subspaces. By way of a non-limiting example, the number of feature subspaces might be set to 16, such that m is equal to 16 and the digital document's feature vector is partitioned into 16 segments, and each segment has a length of 16, or d/m=256/16=16. These values for d and m are intended to be examples; any values for d and m, as well as any other variables or parameters discussed herein, may be used with embodiments of the present disclosure.

At step 106, each of the digital document's feature vector segments is used to identify a code value used to generate a code vector representation of the digital document. To illustrate using the above values for d and m, the digital document's feature vector is partitioned into 16 segments, each of which is used to identify a cell in a corresponding one of the feature space's 16 subspaces. For a given feature subspace, each cell has a corresponding feature vector representation, referred to as a centroid, and the identified cell's centroid is most similar and/or is more closely aligned, relative to other cells' centroids, to the digital document's feature vector segment corresponding to the given feature subspace.

At step 108, the digital document's code vector generated at step 106 is used to make a selection determination with respect to the digital document. By way of a non-limiting example, the digital document's code vector can be used in a search to determine whether or not to include the digital document in a set of search results. By way of some further non-limiting examples, the digital document's code vector can be used to identify the digital document as a duplicate, or a near duplicate, of another digital document, to generate a score, e.g., a relevance score, for the digital document to use in ranking the document in a set of search results, to recommend the digital document based on its similarity, or dissimilarity, with one or more other digital documents, etc. With respect to identifying the digital documents as a duplicate, or near duplicate, of another document, such a determination might be used in a de-duplication operation, in a search or recommendation operation as a filter to cull or limit the duplicates included in a set of search results or recommendation set.

In accordance with one or more embodiments, two documents may be determined to be similar, duplicates or near duplicates based on the outcome of a matching of the two documents' code vectors. The outcome can be a number of positions in the two code vectors that have the same code value. Each similarity, near-duplicate or duplicate determination might use a threshold to compare with the outcome to make a determination. The outcome of the matching operation, e.g., the number of matching code vector positions, can be compared to the threshold, a similarity threshold, a near-duplicate threshold or a duplicate threshold, to make a determination, e.g., determine whether or not the digital documents are similar, near duplicates, or duplicates. By way of a non-limiting example and assuming that the code vector has 16 positions, a similarity threshold might be set at 4, e.g., two documents are similar if at least 4 code positions have the same code value; a near-duplicate threshold can be set to 13 and a duplicate threshold might be set to 14. These values are intended are illustrative only and any value can be used for each threshold.

Figure 2:
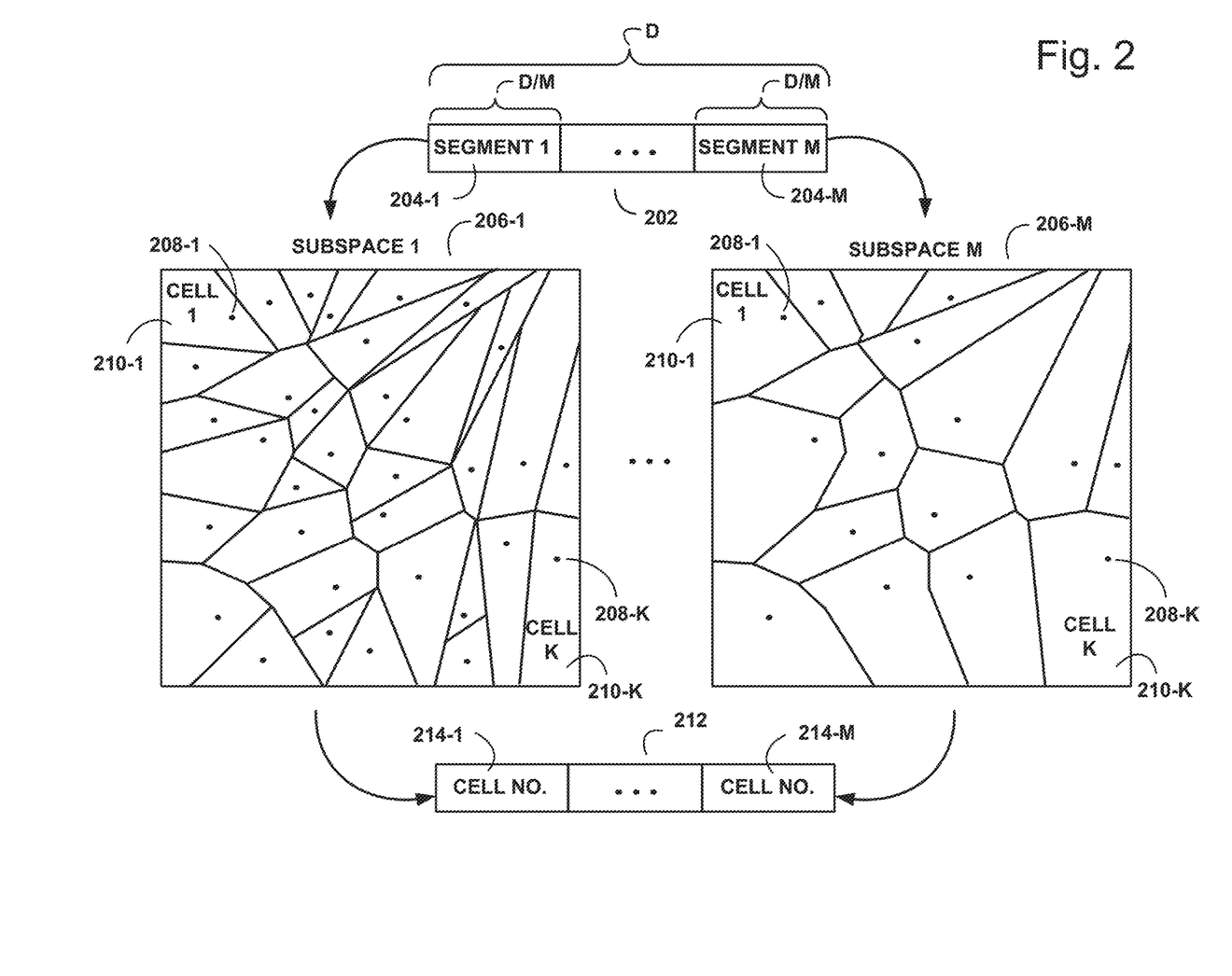
FIG. 2 illustrates use of a feature vector for mapping into a respective region in each of a number of feature subspaces in accordance with one or more embodiments of the present disclosure.

FIG. 2 illustrates use of a feature vector for mapping into a respective region in each of a number of feature subspaces in accordance with one or more embodiments of the present disclosure. In the example shown in FIG. 2, feature vector 202, which may correspond to a digital document, has a length d, and is partitioned into m segments 204, each having a length d/m. Each segment 204 is mapped to a respective feature subspace. For example, segment 204-1, is mapped to subspace 206-1 and segment 204-M-is mapped to feature subspace 206-M.

Each feature subspace 206 comprises a number of regions, or cells, 210. In accordance with one or more embodiments, the cells 210 of a feature subspace 206 can be defined using a collection of digital documents and a number of quantizers that map the collection of digital documents to each feature subspace and a respective region, or cell, in each feature subspace. In accordance with one or more embodiments, the quantizers may comprise a number of course quantizers and a locally optimized product quantizer associated with each cell, 210. Each region, or cell, within a subspace has an associated centroid, or vector representation. A centroid 208 associated with region 210 of a subspace 206 can be determined using each segment 204 mapped to the region 210. For each segment 204 mapped to a cell 210, a residual identifying the difference between the value of the segment 204 and the value of the centroid 208 can be determined, such that a set of residuals of all of the segment 204 mapped to cell 210 may be defined. For a given feature subspace 206, the cell centroids 208 associated with the cells 210 can be used to identify the cell to which a digital document is mapped in the feature subspace. By way of a non-limiting example, for a given feature subspace 206, a difference, or residual, can be determined between the digital document's feature vector segment 204 and each cell's centroid 208, and the digital document can be mapped to the cell associated with the least residual relative to the residuals determined for other cells 210 in the feature subspace 206.

Thus, in accordance with one or more embodiments, a feature subspace can be decomposed into a number of feature subspaces, e.g., m feature subspaces, and each feature subspace can be decomposed into a number of cells, or regions, e.g., k regions, or cells. By way of a non-limiting example, k might equal 256 resulting in 256 cells 210 in a given subspace 206. In addition, each digital document can be represented as a set of codes, each code corresponding to a respective feature subspace 206 and identifying a cell 210 within the feature subspace 206. In the example shown in FIG. 2, the feature vector 202 is partitioned into segments 204, each segment 204 is mapped to a cell 210 in each feature subspace 206, and a value, e.g., an index value or cell number, representing the region 210 is used to generate code vector 212. Code vector 212 comprises a number of value or index values, each of which corresponding to a feature subspace 206 and a cell 210 in the subspace 206 to which the digital document is mapped.

In the example of FIG. 2, each subspace 206 can be represented by the centroids 208 determined for the subspace. As a set, the centroids 208 associated with a subspace 206 can be referred to as the codebook for the subspace 206, and each centroid 208 can be referred to as a code from the codebook for the subspace 206. Each value 214 in code vector 212 identifies the code as well as the region in a corresponding feature subspace 206. In addition, each value 214 can be used as a pointer into an index, e.g., an inverted index, of digital documents. More particularly, each digital document mapped to a cell 210 of a subspace 206 can be indexed for identification and/or retrieval using an index, e.g., an inverted index, and each value 214 from code vector 212 can be used as a pointer to each set of digital documents associated with each cell 210 identified in the code vector 212.

In accordance with one or more embodiments, each digital document can be represented by its feature vector 202, which comprises a number of features of the digital document, and by its code vector 212, which comprises a number of indices into a number of feature subspace regions determined using the digital document's feature vector 202.

Figure 3:
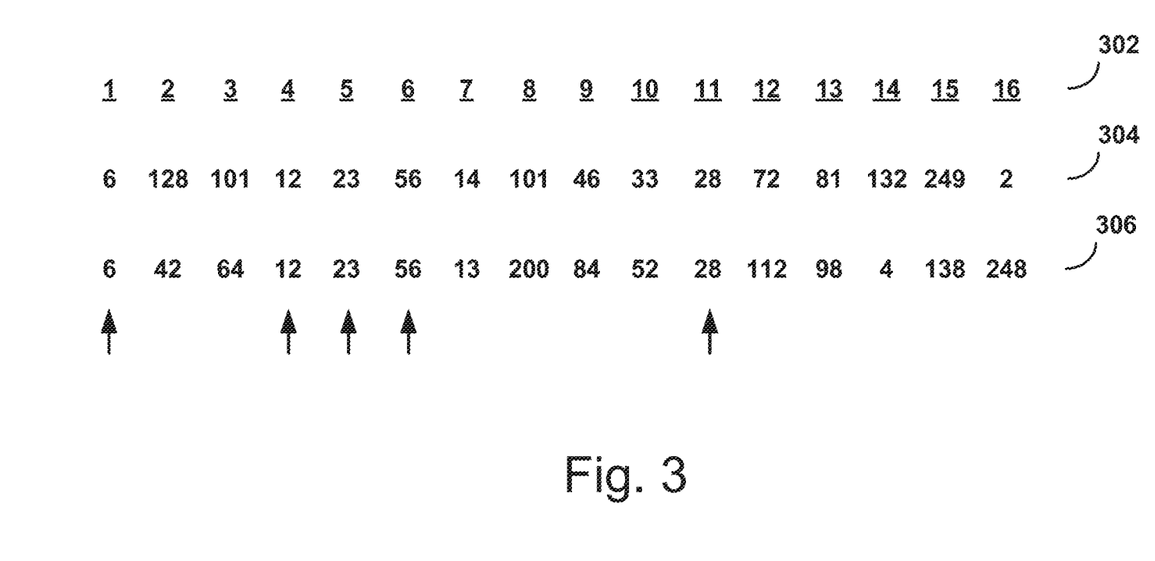
FIG. 3 provides code vector examples for use in accordance with one or more embodiments of the present disclosure.

FIG. 3 provides code vector examples for use in accordance with one or more embodiments of the present disclosure. The example shown in FIG. 3 includes two code vectors 304 and 306, each of which comprising 16 codes, or indices. For purposes of illustration, position indicators 302 provide an indication of each code position in code vectors 304 and 306. One or both of the code vectors 304 and 306 can represent a digital document, and in such a case each code vector can be determined using a digital document's feature vector representation.

In accordance with one or more embodiments, the code values in each of code vectors 304 and 306 can be used to identify the number of code collisions that occur between the two code vectors 304 and 306. In the example shown in FIG. 3, there are five code collisions, at positions 1, 4-6 and 11. Each code collision can be determined by comparing the two code values found at the same position in the two code vectors 304 and 306 to determine if the code values are the same indicating that they map to the same cell within a given feature subspace. In the example of FIG. 3, the code vectors 304 and 306 map to the same region in each of feature subspaces 1, 4-6 and 11, such that there are 5 code collisions occurring in the code vectors 304 and 306.

The number of code collisions can be used to determine whether digital documents are similar or dissimilar, and can be used to quantify the similarity or dissimilarity. The quantification can be used in ranking digital documents. For example, assume that code vector 304 represents a search query, e.g., a criteria to search for similar or relevant digital documents, and code vector 306 is one of the digital documents being considered in the search. The number of code collisions, e.g., 5, between code vectors 304 and 306 can be used as a score of the similarity or relevance of the digital document represented by code vector 306 with respect to the search criteria represented by code vector 304. Code vector 304 can be compared with a number of other digital document code vectors to generate a score for each such digital document and the resulting scores can be used to rank the digital documents. The ranking may be used to order the digital documents identified by the search and/or to select a number of the top-ranked digital documents for inclusion in a set of search results generated using code vector 304 as the search criteria.

As yet another non-limiting example, the number of code collisions can be used to identify duplicates. By way of some non-limiting examples, 3 or 4 code collisions might indicate that two documents are similar, while 13 or 14 code collisions might indication that the documents are duplicates or near-duplicates of each other. A de-duplication process may use the number of code collisions between two or more documents to identify duplicate, or near-duplicate, documents, which might be removed or identified as duplicates. In addition, duplicate identification can be used as part of a search to filter out duplicates from the search results.

As yet a further non-limiting example, the number of code collisions can be used in identifying a set of recommendations. By way of a non-limiting example, code vector 304 might be criteria for selecting a number of recommendations based on each document's number of code collisions determined using its code vector, e.g., code vector 306, and code vector 304. Code vector 304 might represent content that is liked, or disliked, by a user, and the number of code collisions can be used to identify documents that are similar, or dissimilar, to the content.

Embodiments of the present disclosure can be combined with a recommendation method, such as and without limitation a collaborative recommendation method. By way of a non-limiting example, a degree of similarity, or dissimilarity, between users' likes, or dislikes, can be determined by comparing code vectors associated with the users. By way of a further non-limiting example, users determined to have similar tastes may be identified and a number of digital documents that are liked by a first user can be recommended to a second user with similar tastes, even in a case that the second user has not yet indicated a rating for a recommended document. As yet another example, code vectors associated with two digital documents, a first one being liked by the first user, can be used to determine that the two digital documents are similar enough to be recommended to the first user and/or the second user.

Figure 4:
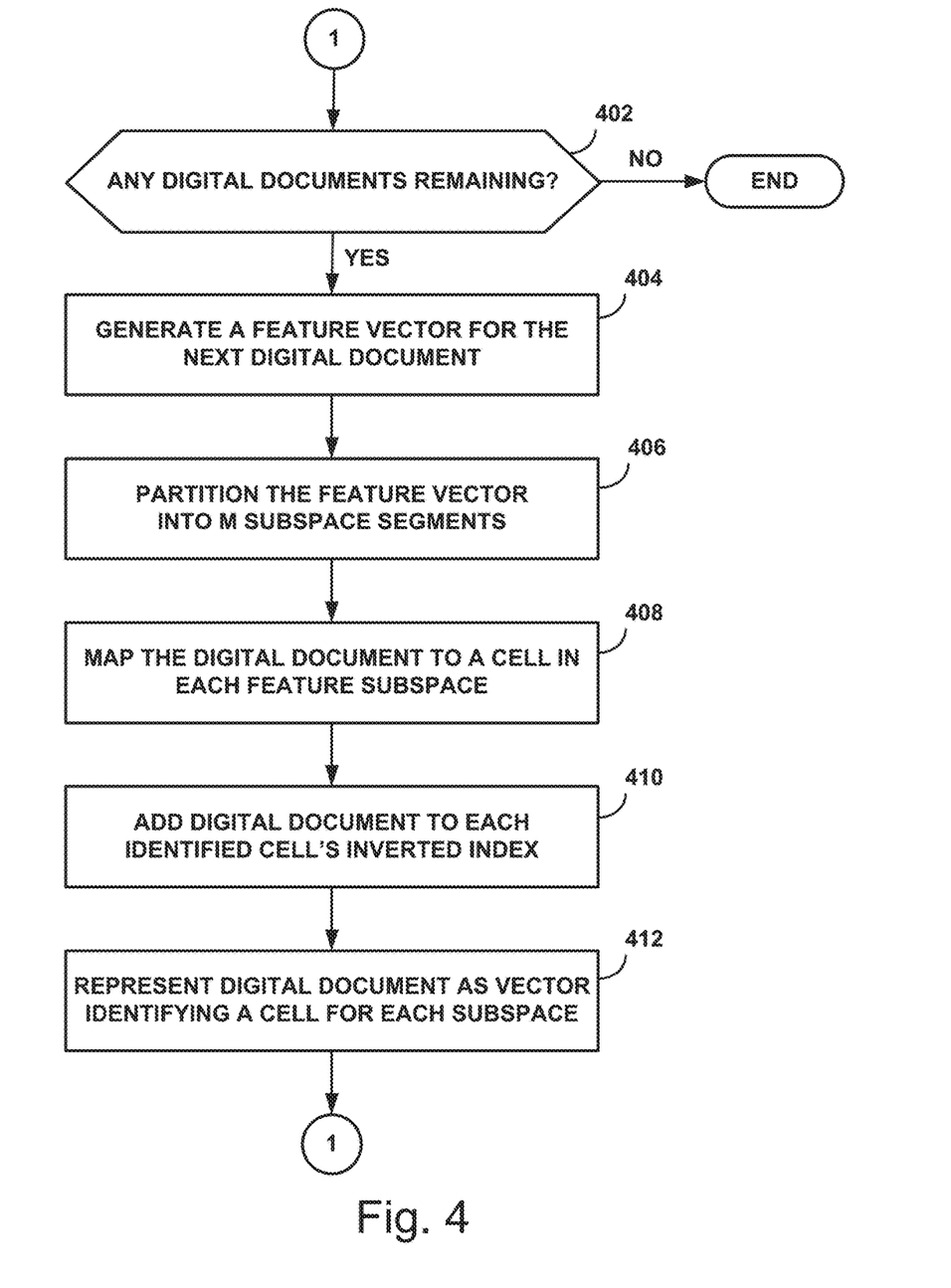
FIG. 4 provides a mapping and indexing process flow for use in accordance with one or more embodiments of the present disclosure.

In accordance with at least one embodiment of the present disclosure, a number of indexes, e.g., inverted indexes, may be used to identify a mapping of each digital document in a collection of digital documents to a given region in each feature subspace. FIG. 4 provides a mapping and indexing process flow for use in accordance with one or more embodiments of the present disclosure.

The process flow example provided in FIG. 4 may be used to process a collection comprising a number of digital documents. At step 402, a determination is made whether there are any digital documents, e.g., digital documents in the collection, remaining to be processed, e.g., mapped and indexed. If not processing ends. If it is determined, at step 402, that at least one digital document remains to be processed, processing continues at step 404. At step 404, a next digital document is selected and a feature vector is generated for the digital document. At step 406, the feature vector that is generated for the digital document at step 404 is partitioned into a number of segments corresponding to the number of subspaces, e.g., m segments corresponding to m subspaces.

At step 408, the digital document is mapped to a cell in each feature subspace using the feature vector segment corresponding to each feature subspace. At step 410, the digital document is added to each identified cell's index of digital documents. By way of a non-limiting example, an inverted index can be used to associate a cell with each digital document mapped to the cell. For purposes of illustration, an inverted index is used; however, it should be apparent that other suitable types of data structure that associate a feature subspace's cell to the digital documents mapped to the cell can be used. At step 412 the digital document is represented as a code vector comprising a code value identifying each cell in each feature subspace to which the digital document is mapped. Processing continues at step 402 to process any remaining digital documents.

Figure 5A:
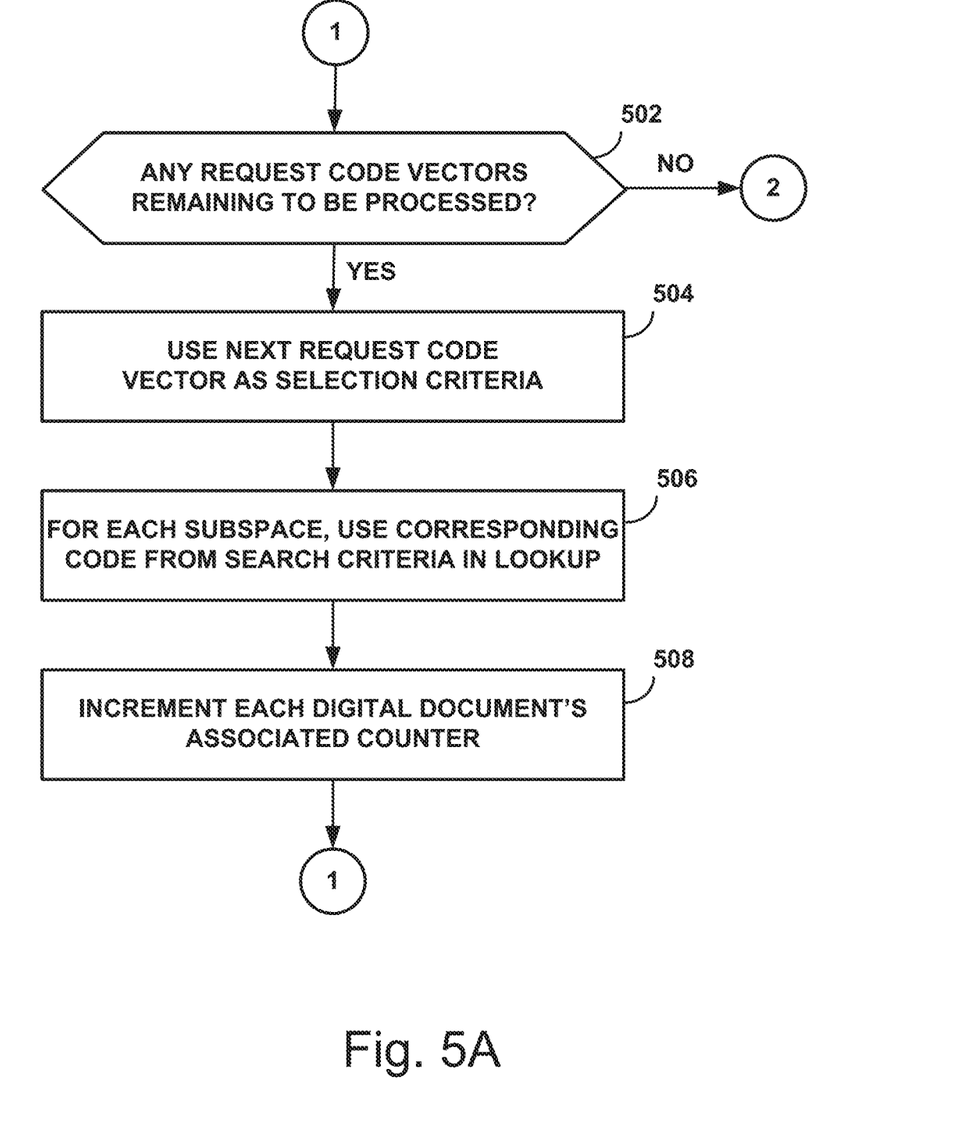
Figure 5B:
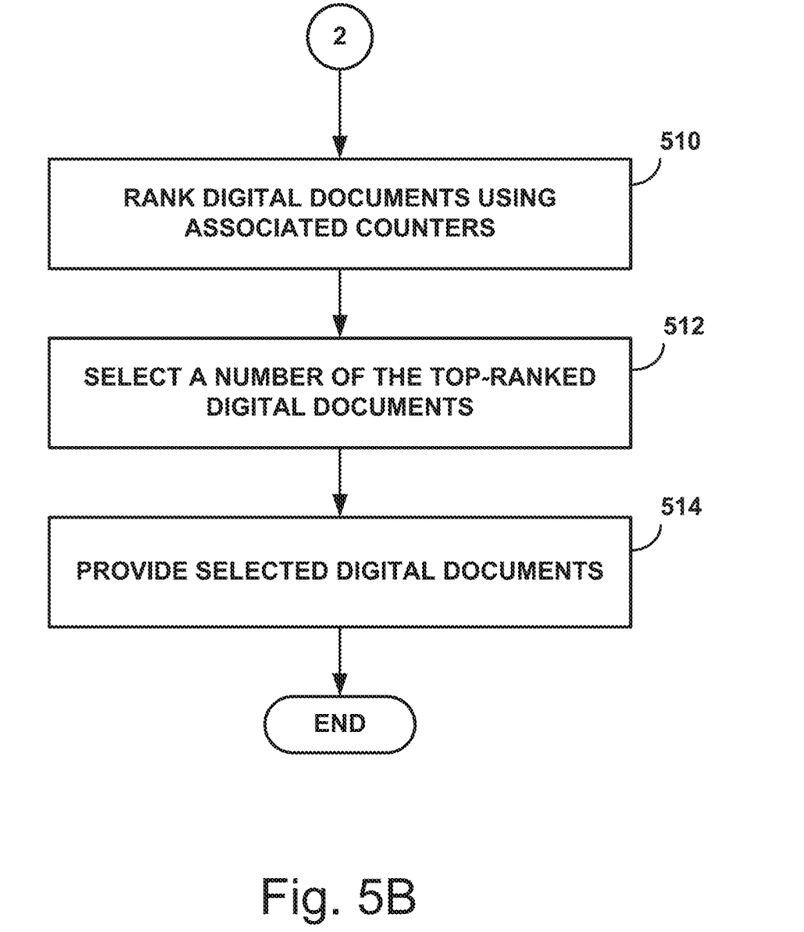

FIG. 5, which comprises FIGS. 5A and 5B, provides a process flow for use in accordance with one or more embodiments of the present disclosure. The process flow of FIG. 5 can be used to retrieve and/or recommend a set of digital documents, for example.

At step 502, a determination is made whether or not any request code vectors remain to be processed. A request code vector can be one of a number of code vectors used as criteria for identifying a number of digital documents from a collection of digital documents. By way of a non-limiting example, a request code vector can be code vector 304 or 306 of FIG. 3. By way of a further non-limiting example, each request code vector can be a query input, such as a digital image for which other similar digital images are to be identified using embodiments of the present disclosure.

If it is determined, at step 502, that there is at least one request code vector remaining to be processed, processing continues at step 504. At step 504, the next request code vector is used as criteria for digital document selection. At step 506, each code value in the request code vector is used to identify those digital documents the feature subspace region identified by the code value. Using code vector 304 as an example of a request code vector, the code value 6 identifies cell number 6 in feature subspace 1, and the code value can be used to identify each digital document associated with cell number 6 in an inverted index, or other suitable data structure associating a feature subspace's cell to the digital documents mapped to the cell.

Referring again to FIG. 5A, a counter associated with each document identified at step 506 is incremented, so that a digital document's counter is incremented at step 508 each time the digital document is identified at step 506. Each digital document's counter is indicative of the number of collisions between the digital document's code vector and each request code vector used in the process. With reference to FIG. 3, assuming that code vector 304 is a request code vector and code vector 306 represents a digital document identified at step 506, the digital document would be identified five times, e.g., in the indexes associated with feature subspaces 1, 4-6 and 11, and the digital document's counter would be equal to 5 after processing code vector 306.

If additional request code vectors are processed, the counter associated with each such digital document represented by code vector 306 can be updated to reflect any code collisions between such request code vectors and the digital document's code vector 306. By way of a non-limiting example, assume that a second request code vector is processed and 8 code collisions are detected between the second request code vector and code vector 306, the counter value is increased to 13, so that the counter represents an aggregate of the code collisions detected from the number of request code vectors processed.

If a determination is made, at step 502, that there are no more request code vectors to be processed, processing continues at step 510 of FIG. 5B. At this point, each digital document identified in processing each request code vector has an associated counter identifying the aggregate number of code collisions detected across the number of request code vectors processed. The number of code collisions identified by each counter can be used in ranking the identified digital documents. By way of a non-limiting example, the digital document with the highest number of code collisions, e.g., the digital document having the highest counter value, can be identified as being the most similar or most relevant to the request code vector(s). By way of a further non-limiting example, the digital document with the lowest number of collisions, e.g., the digital document having the lowest counter value, can be identified as being the least similar or least relevant to the request code vector(s).

With reference to step 510 of FIG. 5B, the digital documents identified at step 506 are ranked using each identified document's counter determined at step 508. The selected set of digital documents can be sorted, or ordered, according to the number of collisions, as identified by the counter, associated with each digital document. At step 512, all of the identified documents, or alternatively a certain number of the top-ranked digital documents, can be selected. The digital documents can be selected for inclusion in a set of search results, as a set of recommendations, etc.

Advantageously, embodiments of the present disclosure provide fast, scalable searching, which can run in parallel and provide a ranking. The approach provided in accordance with at least one embodiment of the present disclosure is highly parallelizable and can handle a large number of query documents, e.g., a number of request code vectors, each of which can represent an input query or a partial input query, as well as a large set, or sets, of documents to be searched. In the example of FIG. 5, at least steps 502, 504, 506 and 508 can be performed in parallel for each request code vector, and each parallel process can be further parallelized for each code position in each request code vector, such that a process processing a code can implement steps 502, 504, 506 and 508 separate from each other process processing a code. The counter values generated by each process processing the request code vectors can be aggregated to generate an aggregate counter for each digital document identified to achieve a fast, parallel, accurate document identification and retrieval that provides a natural ranking function.

Figure 6:
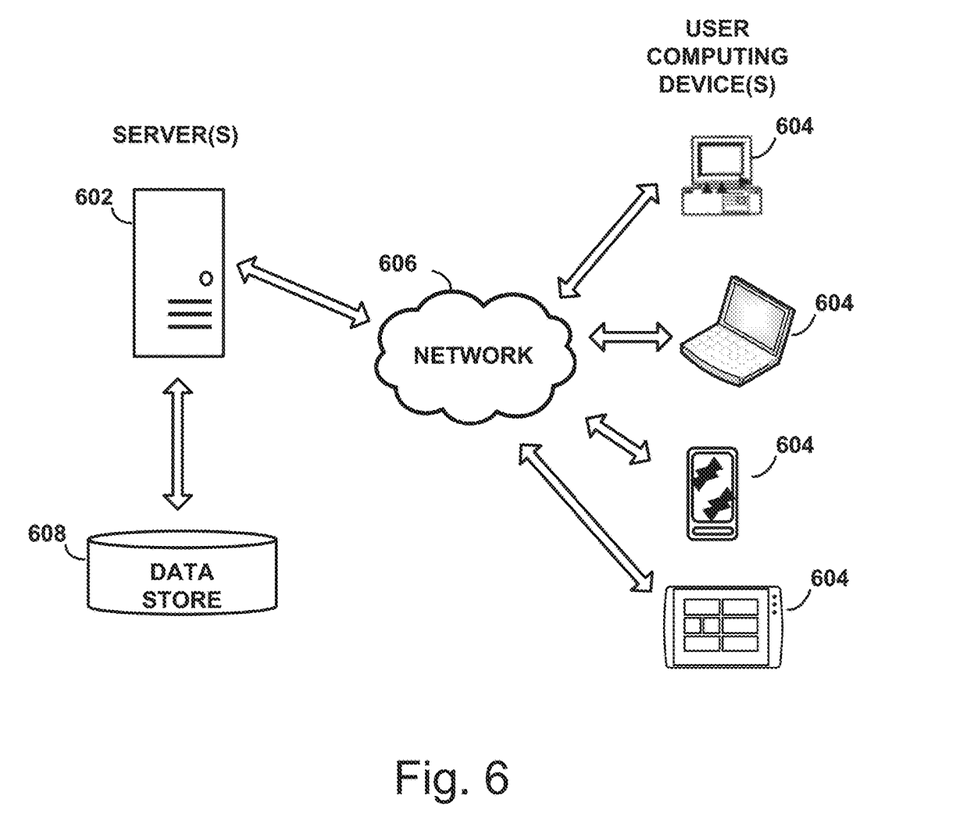
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 602 can be configured to execute program code, instructions, etc. to provide functionality in accordance with one or more embodiments of the present disclosure. The same or another computing device 602 may be configured to execute program code to implement functionality in accordance with one or more embodiments of the present disclosure.

Computing device 602 can serve content to user computing devices 604 using a browser application via a network 606. Data store 608 can be used to store program code to configure a server 602 to functionality in accordance with one or more embodiments of the present disclosure. In addition, data store 608 can be used to store a collection of digital documents, a code vector for each digital document in the collection, a codebook comprising a set of centroids identified for each region of each feature subspace, an association between each cell of each feature subspace and each digital document mapped to the cell.

The user computing device 604 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 6. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 7:
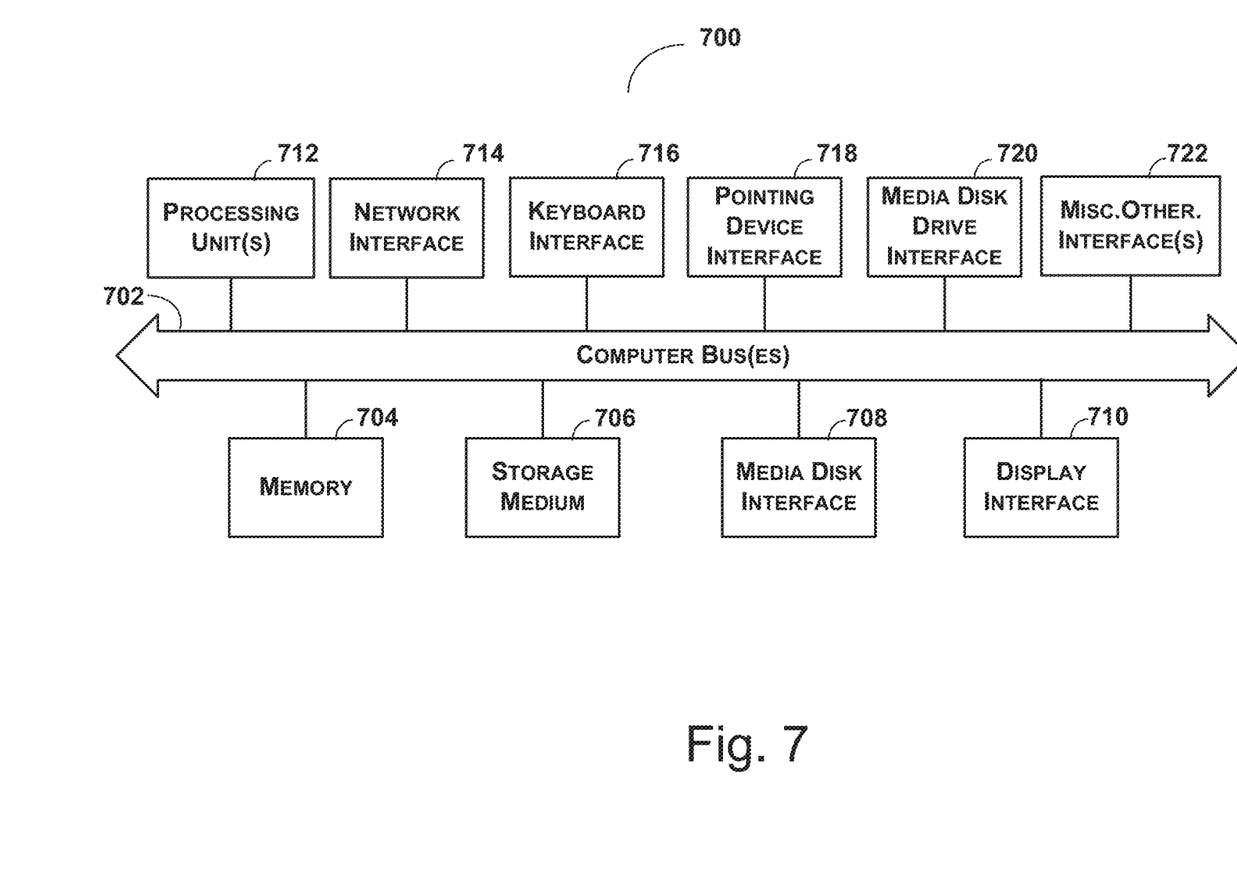
FIG. 7 is a detailed block diagram illustrating an internal architecture of a computing device in accordance with one or more embodiments of the present disclosure.

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   generating, by a computing device, a feature vector for a digital document, the generated feature vector comprising a plurality of features of the digital document;
   partitioning, by the computing device, the digital document's feature vector into a plurality of feature vector segments, each feature vector segment corresponding to a subspace of a plurality of subspaces of a feature space, each subspace comprising a plurality of cells;
   generating, by the computing device, a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and
   making a determination, by the computing device, whether to select the digital document, in response to a digital document request, the determination comprising determining a score for the digital document by comparing the digital document's code vector and a code vector associated with the digital document request to determine a number of matches and making the determination using the determined score.

2. The method of claim 1, wherein the digital document is a digital image, the feature vector comprising a number of features of the digital image.

3. The method of claim 1, generating a code vector further comprising:
   determining, by the computing device, a vector representation for each cell in each subspace of the feature space using a plurality of digital documents, the vector representation for a given cell and a given subspace being determined using a corresponding segment of the vector representation of each of a number of digital documents of the plurality mapped to the given cell;
   for each subspace of the plurality, determining a code for the digital document's code vector corresponding to the subspace, the corresponding code identifying the cell of the plurality of cells in the subspace whose feature vector is more similar to the segment of the digital document's vector representation corresponding to the subspace than the feature vectors of other cells of the plurality.

4. The method of claim 1, the determining a score comprising determining a similarity score between the digital document's code vector and the digital document request's code vector, the similarity score identifying a number of feature subspaces in which the digital document shares a same cell as the request, as indicated by the digital document's code vector and the request's code vector.

5. The method of claim 4, further comprising:
   determining, by the computing device and using the number of common cells, whether the digital document is a near duplicate of another digital document represented by the request's code vector.

6. The method of claim 1, making a determination further comprising:
   the digital document request comprising a search request, the request's code vector comprising search criteria for the search request, and the digital document is one of a plurality of digital documents each one having a corresponding code vector, the making a determination further comprising:
   for each digital document of the plurality, determining the score for the digital document, the score representing a similarity between the digital document's code vector and the digital document request's associated code vector, the similarity being the number of feature subspaces in which the digital document shares a same cell as the request, as indicated by the digital document's code vector and the request's code vector;
   ranking, by the computing device, the plurality of digital documents using the similarity determined for each digital document of the plurality; and
   selecting, by the computing device, a number of top-ranked documents from the plurality of documents.

7. The method of claim 6, further comprising:
   creating, by the computing device, an inverted index for each cell of each feature subspace, a cell's inverted index identifying each digital document of the plurality mapped to the cell;
   for each feature subspace's code in the search criteria's code vector:
   performing, by the computing device, an inverted index look up using the feature subspace's code to identify each digital document of the plurality in the inverted index that is associated with the cell identified using the feature subspace's code; and
   incrementing, by the computing device, the score associated with each identified digital document by one.

8. The method of claim 7, the performing and incrementing elements performed for each feature subspace are performed in parallel.

9. A system comprising:
   at least one computing device, each computing device comprising a processor and a storage medium for tangibly storing thereon program logic for execution by the processor, the stored program logic comprising:
   generating logic executed by the processor for generating a feature vector for a digital document, the generated feature vector comprising a plurality of features of the digital document;
   partitioning logic executed by the processor for partitioning the digital document's feature vector into a plurality of feature vector segments, each feature vector segment corresponding to a subspace of a plurality of subspaces of a feature space, each subspace comprising a plurality of cells;

generating logic executed by the processor for generating a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and making logic executed by the processor for making a determination whether to select the digital document, in response to a digital document request, the determination comprising determining a score for the digital document by comparing the digital document's code vector and a code vector associated with the digital document request to determine a number of matches and making the determination using the determined score.

10. The system of claim 9, wherein the digital document is a digital image, the feature vector comprising a number of features of the digital image.

11. The system of claim 9, the generating logic executed by the processor for generating a code vector further comprising:

determining logic executed by the processor for determining a vector representation for each cell in each subspace of the feature space using a plurality of digital documents, the vector representation for a given cell and a given subspace being determined using a corresponding segment of the vector representation of each of a number of digital documents of the plurality mapped to the given cell;

determining logic executed by the processor for determining, for each subspace of the plurality, a code for the digital document's code vector corresponding to the subspace, the corresponding code identifying the cell of the plurality of cells in the subspace whose feature vector is more similar to the segment of the digital document's vector representation corresponding to the subspace than the feature vectors of other cells of the plurality.

12. The system of claim 9, the determining logic executed by the processor for determining a score further comprising determining logic executed by the processor for determining a similarity score between the digital document's code vector and the digital document request's code vector, the similarity score identifying a number of feature subspaces in which the digital document shares a same cell as the request, as indicated by the digital document's code vector and the request's code vector.

13. The system of claim 12, the stored program logic further comprising:

determining logic executed by the processor for determining, using the number of common cells, whether the digital document is a near duplicate of another digital document represented by the request's code vector.

14. The system of claim 9, further comprising:

the digital document request comprising a search request, the request's code vector comprising search criteria for the search request, and the digital document is one of a plurality of digital documents each one having a corresponding code vector, the making logic executed by the processor for making a determination further comprising:

determining logic executed by the processor for determining, for each digital document of the plurality, the score for the digital document, the score representing a similarity between the digital document's code vector and the digital document request's associated code vector, the similarity being the number of feature subspaces in which the digital document shares a same cell as the request, as indicated by the digital document's code vector and the request's code vector;

ranking logic executed by the processor for ranking the plurality of digital documents using the similarity determined for each digital document of the plurality; and selecting logic executed by the processor for selecting a number of top-ranked documents from the plurality of documents.

15. The system of claim 14, the stored program logic further comprising:

creating logic executed by the processor for creating an inverted index for each cell of each feature subspace, a cell's inverted index identifying each digital document of the plurality mapped to the cell;

for each feature subspace's code in the search criteria's code vector:

performing logic executed by the processor for performing an inverted index look up using the feature subspace's code to identify each digital document of the plurality in the inverted index that is associated with the cell identified using the feature subspace's code; and incrementing logic executed by the processor for incrementing the score associated with each identified digital document by one.

16. The system of claim 15, the performing and incrementing logic being performed for each feature subspace in parallel.

17. A computer readable non-transitory storage medium for tangibly storing thereon computer readable instructions that when executed cause at least one processor to:

generate a feature vector for a digital document, the generated feature vector comprising a plurality of features of the digital document;

partition the digital document's feature vector into a plurality of feature vector segments, each feature vector segment corresponding to a subspace of a plurality of subspaces of a feature space, each subspace comprising a plurality of cells;

generate a code vector for the digital document, each code in the digital document's code vector corresponding to a respective subspace of the plurality subspaces of the feature space and identifying, using a corresponding feature vector segment, a cell of the respective subspace's plurality of cells with which the digital document is most similar relative to other cells of the plurality in the respective subspace; and make a determination whether to select the digital document, in response to a digital document request, the determination comprising determining a score for the digital document by comparing the digital document's code vector and a code vector associated with the digital document request to determine a number of matches and making the determination using the determined score.

18. The computer readable non-transitory storage medium of claim 17, wherein the digital document is a digital image, the feature vector comprising a number of features of the digital image.

19. The computer readable non-transitory storage medium of claim 17, the computer readable instructions that when executed cause the at least one processor to generate a code vector further cause the at least one processor to:
   determine a vector representation for each cell in each subspace of the feature space using a plurality of digital documents, the vector representation for a given cell and a given subspace being determined using a corresponding segment of the vector representation of each of a number of digital documents of the plurality mapped to the given cell;
   for each subspace of the plurality, determine a code for the digital document's code vector corresponding to the subspace, the corresponding code identifying the cell of the plurality of cells in the subspace whose feature vector is more similar to the segment of the digital document's vector representation corresponding to the subspace than the feature vectors of other cells of the plurality.

20. The computer readable non-transitory storage medium of claim 17, the computer readable instructions that when executed cause the at least one processor to determine a score further cause the at least one processor to determine a similarity score between the digital document's code vector and the digital document request's code vector, the similarity score identifying a number of feature subspaces in which the digital document shares a same cell as the request, as indicated by the digital document's code vector and the request's code vector.

21. The computer readable non-transitory storage medium of claim 20, the computer readable instructions that when executed further cause the at least one processor to:
   determine, using the number of common cells, whether the digital document is a near duplicate of another digital document represented by the request's code vector.

22. The computer readable non-transitory storage medium of claim 17:
   the digital document request comprising a search request, the request's code vector comprising search criteria for the search request, and the digital document is one of a plurality of digital documents each one having a corresponding code vector, the computer readable instructions that when executed cause the at least one processor to make a determination further cause the at least one processor to:
   for each digital document of the plurality, determine the score for the digital document, the score representing a similarity between the digital document's code vector and the digital document request's associated code vector, the similarity being the number of feature subspaces in which the digital document shares a same cell as the request, as indicated by the digital document's code vector and the request's code vector;
   rank the plurality of digital documents using the similarity determined for each digital document of the plurality; and
   select a number of top-ranked documents from the plurality of documents.

23. The computer readable non-transitory storage medium of claim 22, the computer readable instructions that when executed further cause the at least one processor to:
   create an inverted index for each cell of each feature subspace, a cell's inverted index identifying each digital document of the plurality mapped to the cell;
   for each feature subspace's code in the search criteria's code vector:
      perform, an inverted index look up using the feature subspace's code to identify each digital document of the plurality in the inverted index that is associated with the cell identified using the feature subspace's code; and
      increment the score associated with each identified digital document by one.

24. The computer readable non-transitory storage medium of claim 23, the performing and incrementing performed for each feature subspace are performed in parallel.

* * * * *